(12) United States Patent
Barnett et al.

(10) Patent No.: US 6,187,275 B1
(45) Date of Patent: *Feb. 13, 2001

(54) RECOVERY OF ALF$_3$ FROM SPENT POTLINER

(75) Inventors: Robert J. Barnett, Goldendale, WA (US); Michael B. Mezner, Sandy, OR (US)

(73) Assignee: Goldendale Aluminum Company, Goldendale, WA (US)

( * ) Notice: Under 35 U.S.C. 154(b), the term of this patent shall be extended for 0 days.

This patent is subject to a terminal disclaimer.

(21) Appl. No.: 09/201,197

(22) Filed: Nov. 30, 1998

Related U.S. Application Data

(60) Division of application No. 08/977,435, filed on Nov. 24, 1997, now Pat. No. 5,955,042, which is a continuation-in-part of application No. 08/569,271, filed on Dec. 8, 1995, now Pat. No. 5,723,097.

(51) Int. Cl.$^7$ .............................. C01F 7/00; C22B 21/00; C01C 3/00; C01B 9/00
(52) U.S. Cl. .......................... 423/126; 423/132; 423/236; 423/484; 423/489
(58) Field of Search ................................. 423/126, 132, 423/495, 236, 489, 484; 588/246

(56) References Cited

U.S. PATENT DOCUMENTS

| | | | |
|---|---|---|---|
| 3,855,401 | * 12/1974 | Aiso et al. | 423/111 |
| 4,238,469 | * 12/1980 | Schmidt et al. | 423/495 |
| 4,355,017 | * 10/1982 | Gamson et al. | 423/132 |
| 4,597,953 | * 7/1986 | Bush | 423/132 |
| 5,470,559 | * 11/1995 | Grolman et al. | 423/111 |
| 5,558,847 | * 9/1996 | Kaaber et al. | 423/132 |
| 5,683,663 | * 11/1997 | Keller et al. | 423/111 |
| 5,723,097 | * 3/1998 | Barnett et al. | 423/111 |

FOREIGN PATENT DOCUMENTS

| | | | |
|---|---|---|---|
| 648913 | * 8/1992 | (AU) | 423/126 |
| 2495954 | * 6/1982 | (FR) | 423/495 |
| 2167396 | * 5/1986 | (GB) | 423/236 |
| 50-105539 | * 8/1975 | (JP) | 423/236 |

\* cited by examiner

*Primary Examiner*—Steven Bos
(74) *Attorney, Agent, or Firm*—Andrew Alexander

(57) ABSTRACT

A method of recovering AlF$_3$ from spent potliner using an acid digest to form gaseous HF which is converted to hydrofluoric acid and reacted with alumina trihydrate to form AlF$_3$.

11 Claims, 8 Drawing Sheets

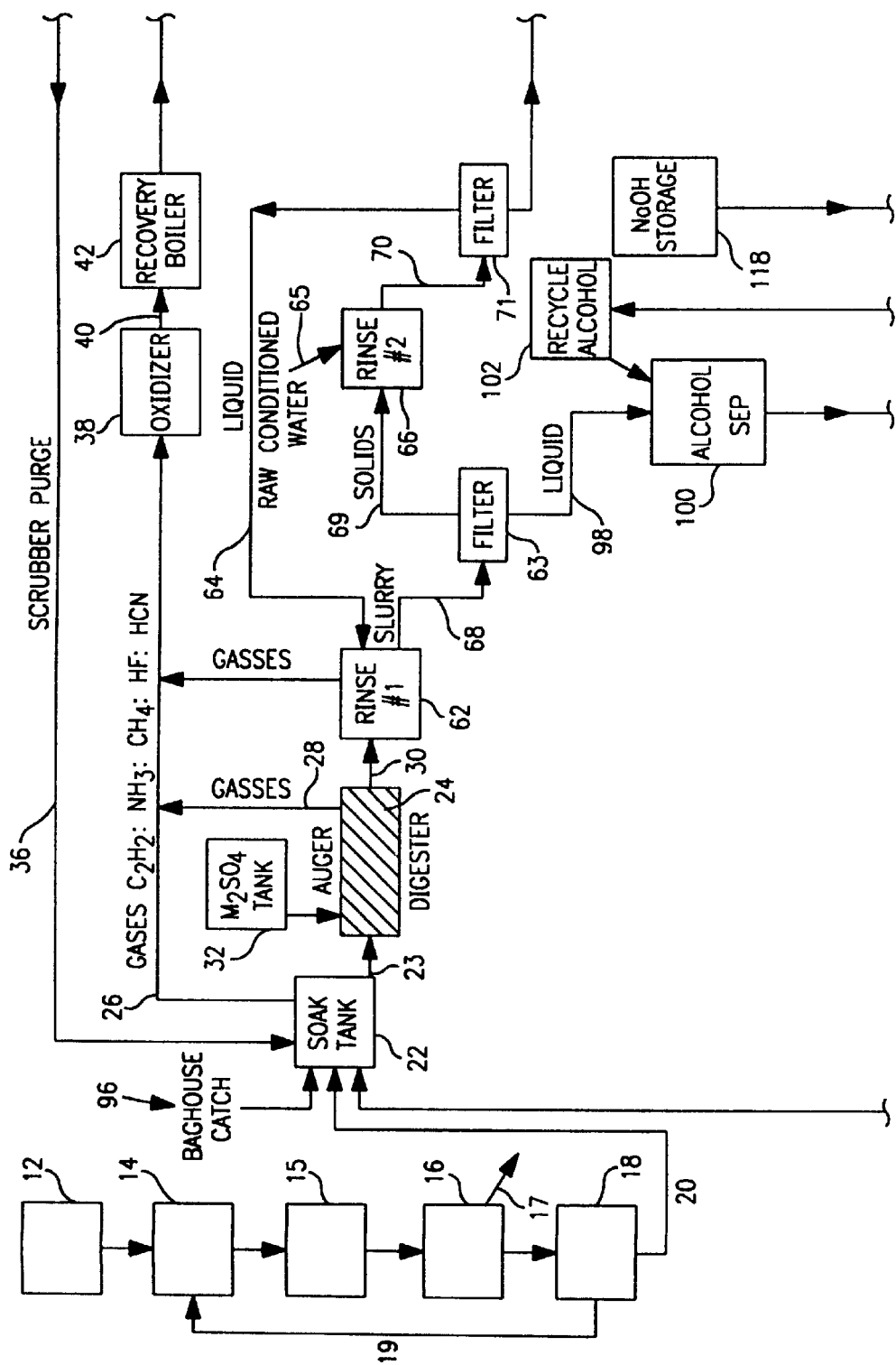
FIG. IA

RECOVERY OF ALF₃ FROM SPENT POTLINER

CROSS REFERENCE TO RELATED APPLICATIONS

This application is a division of U.S. Ser. No. 08/977,435, filed Nov. 24, 1997 now U.S. Pat. No. 5,955,042 which is a continuation-in-part of U.S. Ser. No. 08/569,271, filed Dec. 8, 1995 now U.S. Pat. No. 5,723,097 entitled "Method of Treating Spent Potliner Material from Aluminum Reduction Cells".

BACKGROUND OF THE INVENTION

1. Field of the Invention

The present invention relates generally to processes for treating spent potliner material from aluminum reduction cells in a manner in which hazardous wastes are converted and recycled to useful, non-hazardous substances. More specifically, the present invention relates to a process of recovering, from spent aluminum potliner material, aluminum fluoride, reusable salts such as sodium sulfate and refractory material such as calcium feldspar which can be used to make brick products, for example. Further, large amounts of energy can be recovered from the carbon, e.g., 8000 to 9000 BTU/lb of carbon.

2. Description of the Prior Art

The Hall-Heroult process for the production of metallic aluminum dates from the $19^{th}$ Century. Many refinements to the process have been made, but the basic Soderberg or pre-bake configurations using Hall-Heroult cells remain the most common processes for aluminum production throughout the world. In these processes, the bottom and internal walls of a cathode of an aluminum pot are formed with a liner of carbon blocks joined by conductive carbonaceous binder and wrapped with refractory firebricks and insulating bricks, the resulting combination being referred to as "potliner". The insulating bricks and firebricks are composed of material such as silica and alumina (aluminum oxide).

During the production of aluminum, the aluminum reduction pot is filled with a bath of alumina and molten salts. Over the three to seven year life span of an aluminum reduction pot bath, salts migrate into the potliner, thereby resulting in the deterioration and eventual failure of the utility of the aluminum cell as a cathode. During its life span, a cathodic potliner may absorb its own weight in bath salt materials. The failed potliner material is referred to as spent potliner or SPL.

When an aluminum reduction cell is taken out of service, the SPL is cooled and fractured to facilitate subsequent handling and disposal. The fractured SPL is a non-homogenous material which contains carbon, silica and/or alumina from the insulating brick and firebricks, aluminum, significant quantities of sodium salts, aluminum salts and oxides, fluoride salts and traces of cyanides. On the average, a large aluminum smelter with a production capacity of 175,000 tons of aluminum per year will produce about 6,000–12,000 tons of SPL per year. The quantity of SPL generated annually in the United States alone has in recent years exceeded approximately 230,000 tons per year.

Because of its cyanide content, its high concentration of leachable fluoride compounds, and the high volumes of SPL produced, SPL presents a significant environmental hazard and a major burden for aluminum producers, who remain ultimately liable for the proper disposal of SPL. The SPL has long been listed as a hazardous waste by the U.S. federal and state environmental authorities. Current regulations require that SPL ultimately be treated to explicitly remove the toxic cyanide, high concentration of leachable fluoride compounds, and other characteristics which cause it to be listed as hazardous before it can be placed in a landfill disposal site.

Many different approaches have been tried over the years to convert SPL to non-hazardous materials. One major technique includes combustion or incineration of the SPL as exemplified in U.S. Pat. Nos. 4,735,784; 4,927,459; 5,024,822; 5,164,174; 5,222,448 and 5,286,274. Unfortunately, most of these processes result in an end product consisting of a glassy slag material which still contains some hazardous, allegedly non-leachable, materials.

Another process includes chemical treatment to convert SPL to non-hazardous materials. In these types of processes, as exemplified by U.S. Pat. No. 4,113,831, the initial SPL constituents are replaced with compounds which are less toxic but which compounds are still above the hazardous listing levels established by various environmental authorities. Moreover, these residues generally have a final volume which is comparable to the volume of the input.

Another major technique of converting SPL to non-hazardous materials includes pyrohydrolysis of, the SPL material. This process generally includes pyrolysis of the material in conjunction with the introduction of water to create an off-gas containing the fluoride materials as illustrated in U.S. Pat. No. 4,113,832. Such pyrohydrolysis techniques may also be used in conjunction with fluidized bed reactors as disclosed in U.S. Pat. Nos. 4,158,701 and 4,160,808. These processes also still tend to produce large volumes of waste material which must be stored in landfills and which may contain allegedly non-leachable hazardous waste. Thus, there is still a need for a process to chemically treat SPL material from aluminum reduction cells, wherein the end products of such a treatment process are all usable either within the process itself or with other commercial processes as well as secondary end products which are non-toxic to the environment and which do not include large volumes of material for the landfill or for storage.

SUMMARY OF THE INVENTION

It is, accordingly, one object of the present invention to provide a process for treating spent potliner material from aluminum reduction cells.

It is another object of the present invention to provide such a process wherein aluminum fluoride, sodium compounds such as sodium sulfate, calcium compounds and iron compounds and refractory materials such as mullite which can be converted to brick or used as fuel or cement additive, are all recovered from the spent aluminum potliner material in a form which is commercially usable.

Still, it is another object of the present invention to provide a process for treating SPL to selectively recover usable compounds such as aluminum fluoride, sodium sulfate, chloride salts, mullite and other useful materials therefrom.

Yet another object of the present invention is to provide a process for the treating of spent potliner material from aluminum reduction cells which includes a total recycle of all by-products and elimination of all hazardous wastes.

To achieve the foregoing and other objects and in accordance with the purpose of the present invention, as embodied and broadly described herein, a process of treating spent potliner material from aluminum reduction cells and recovering useful products is disclosed. In the process of the present invention, spent potliner material is introduced into an acid digester containing, for example, sulfuric acid. As a result of this step, a gas component is produced which includes hydrogen fluoride and hydrogen cyanide. Also, a slurry component is produced which includes carbon, silica, alumina, sodium compounds such as sodium sulfate, aluminum compounds such as aluminum sulfate, iron compounds such as iron sulfate, magnesium and calcium compounds such as magnesium and calcium sulfate. The slurry component remains in the digester after the gas component is removed. The gas component is recovered and heated an effective amount to convert or decompose the hydrogen cyanide to a remaining gas component including $CO_2$, $H_2O$, and nitrogen oxides, as well as HF gas. The remaining gas component is directed through a water scrubber in which the HF gas is converted to liquid hydrofluoric acid. The hydrofluoric acid is then admixed with alumina trihydrate to form aluminum fluoride (a commercially useful end product) and water.

The slurry component is rinsed with water to separate a solid fraction containing carbon, and refractory materials such as alumina and silica from a liquid fraction. The solid fraction may be admixed with an alumina/silica mixture and then used as fuel in cement or glass manufacturing. Alternatively, the solid fraction can then be subjected to an elevated temperature in an oxygen-rich atmosphere. This causes the carbon to oxidize to carbon dioxide which itself has utility as a fuel, leaving a refractory material such as mullite formed from silica and alumina which has commercial utility in forming brick.

In one aspect of the invention, the remaining liquid portion of the slurry is mixed with alcohol at a preferred ratio of about four parts alcohol to about one part liquid. This step removes in excess of 97% of the salts and leaves a solution of sulfonic acid and alcohol. This solution is then subjected to distillation, with the volatile alcohol being recovered for reuse, and the remaining sulfic acid available to be added back to the system digester to reduce acid consumption. The filtered salts are then dissolved back in $H_2O$ and the pH adjusted to a basic pH, e.g., about 12.0 to 12.5, with NaOH. This step holds aluminum in solution as sodium aluminate and precipitates all other impurities. The solution is filtered to remove the impurities containing calcium, iron, magnesium and silicates primarily. The clear solution is then further pH adjusted to an alkaline pH, e.g., about 7.0 to 8.0 pH, to remove $Al(OH)_3$, and the remaining solution is then admixed with alcohol to form and precipitate sodium sulfate.

In another aspect of the invention, the remaining liquid portion of the slurry may be treated to form soluble sodium aluminate by adjusting the pH, for example, of the liquid portion. Adjusting the pH causes insoluble salts such as calcium, iron and magnesium salts to form a precipitate which is removed leaving a solution containing soluble sodium aluminate. The insoluble salts are then filtered and reused. The insoluble salts are further processed using acid and heat to form a high purity calcium compound. Also, iron compounds are precipitated and recovered from the remaining liquid portion. In addition, magnesium salts are also precipitated and recovered from the remaining liquid portion. The solution remaining after calcium, iron and magnesium salts are removed is added to the solution containing soluble sodium aluminate. The pH of this solution is adjusted to form alumina trihydrate which can be removed from the solution. The solution remaining may be treated to remove residual $Al(OH)_3$ before being added back to the digestion step.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings which are incorporated in and form a part of the specification illustrate complete preferred embodiments of the present invention according to the best modes presently devised for the practical application of the principles thereof, and in which.

DETAILED DESCRIPTION OF THE PREFERRED EMBODIMENTS

Figure 1B:
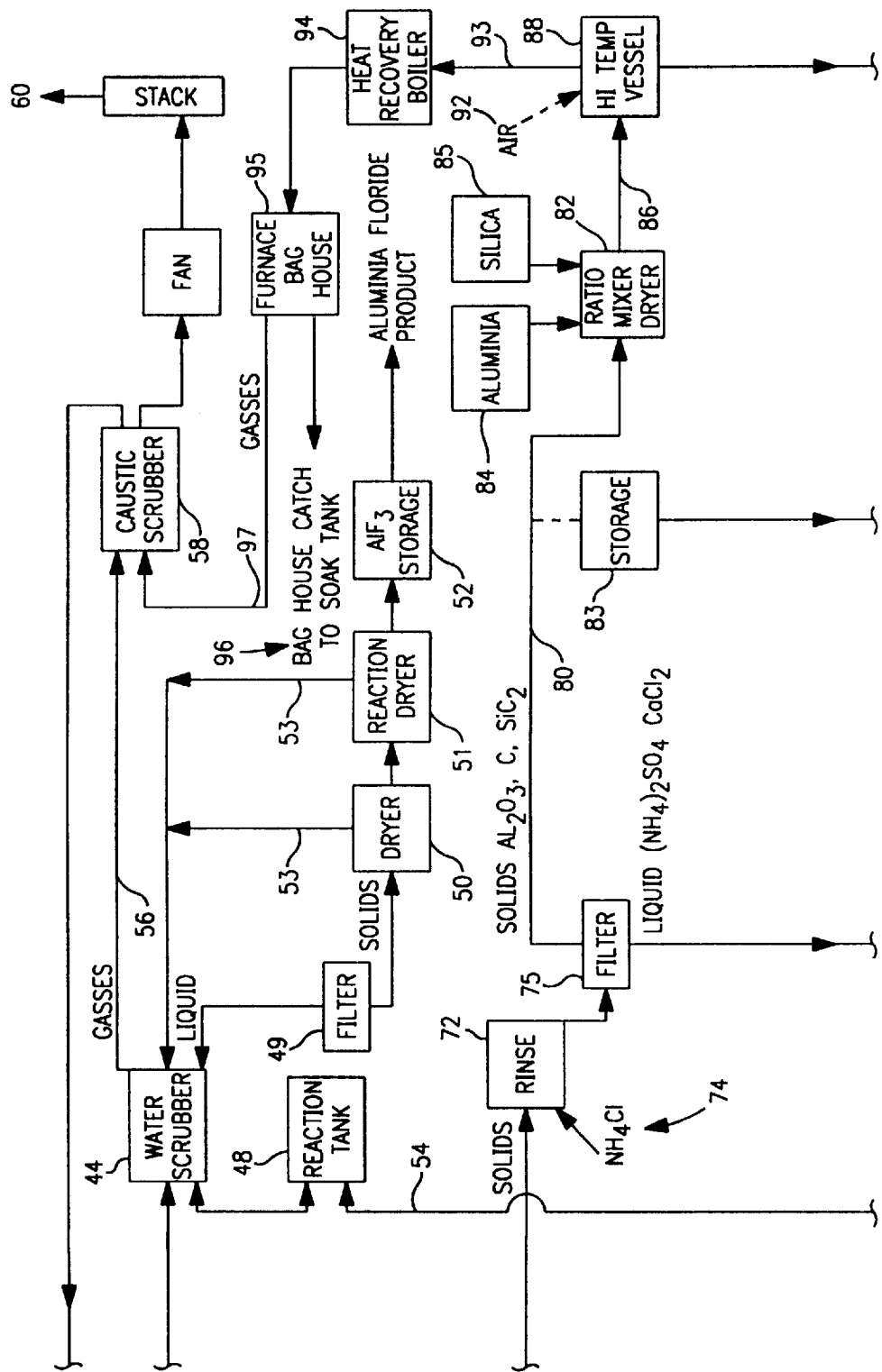
FIG. 1 is a flow diagram illustrating the various process steps and by-products of the present invention.
Figure 1C:
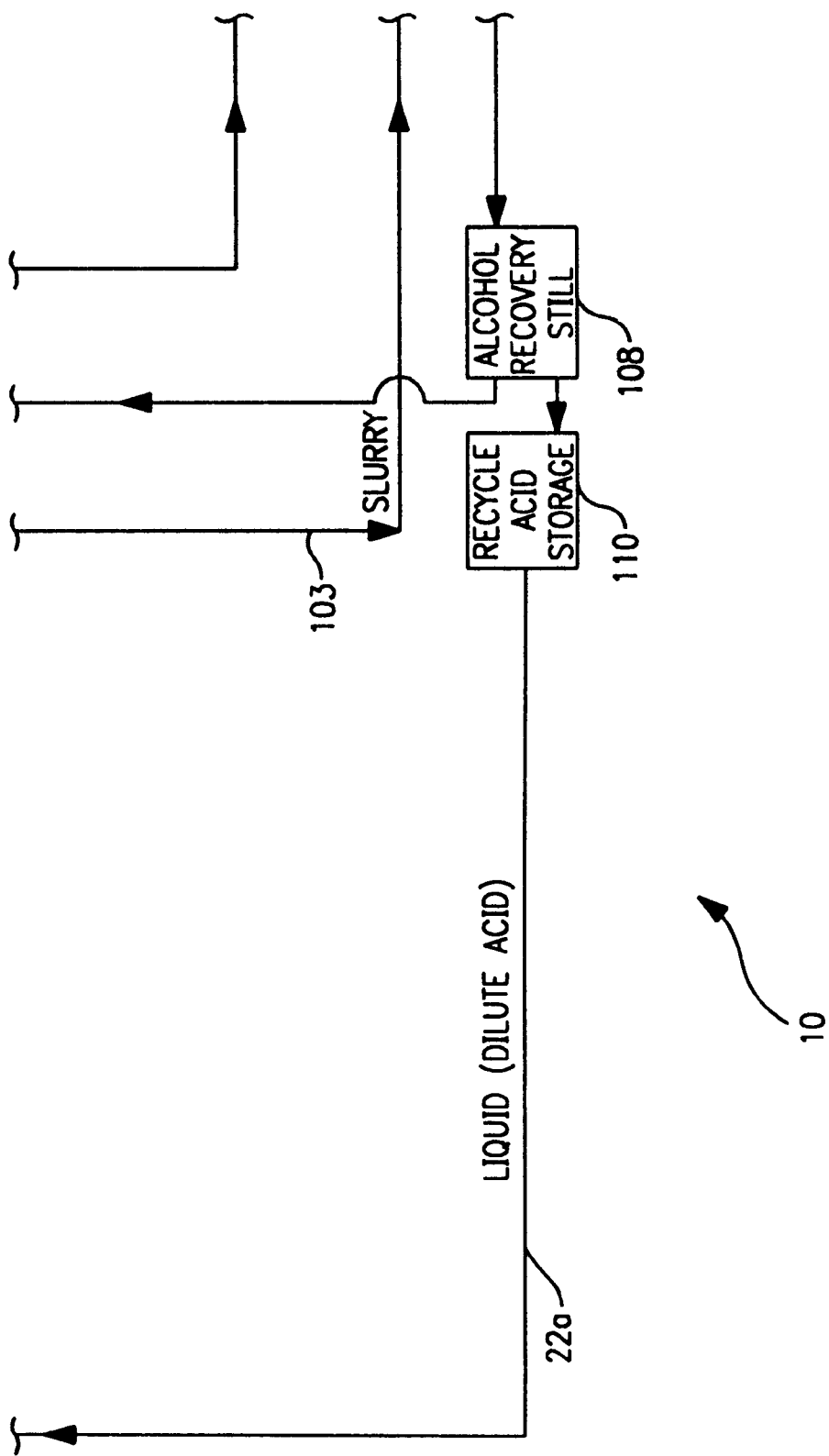
Figure 1D:
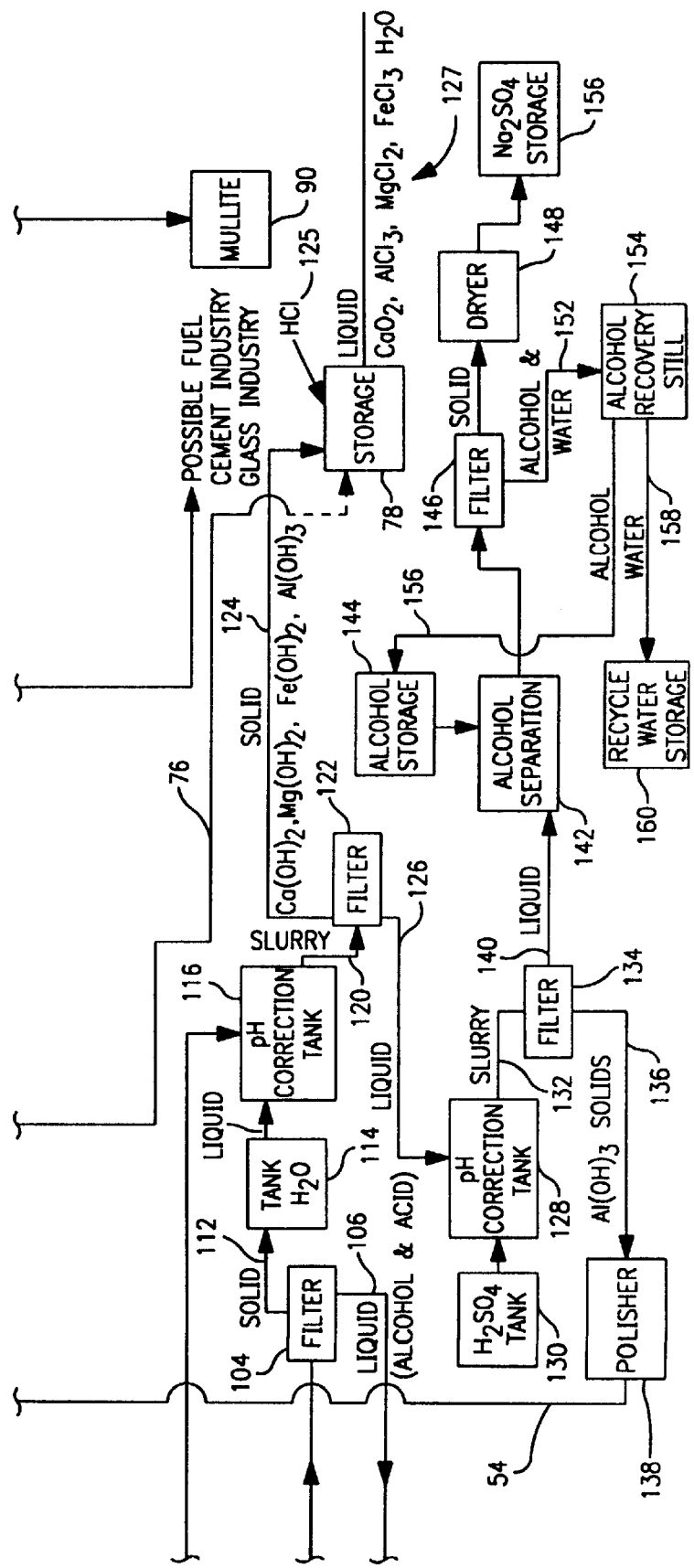
Figure 2:
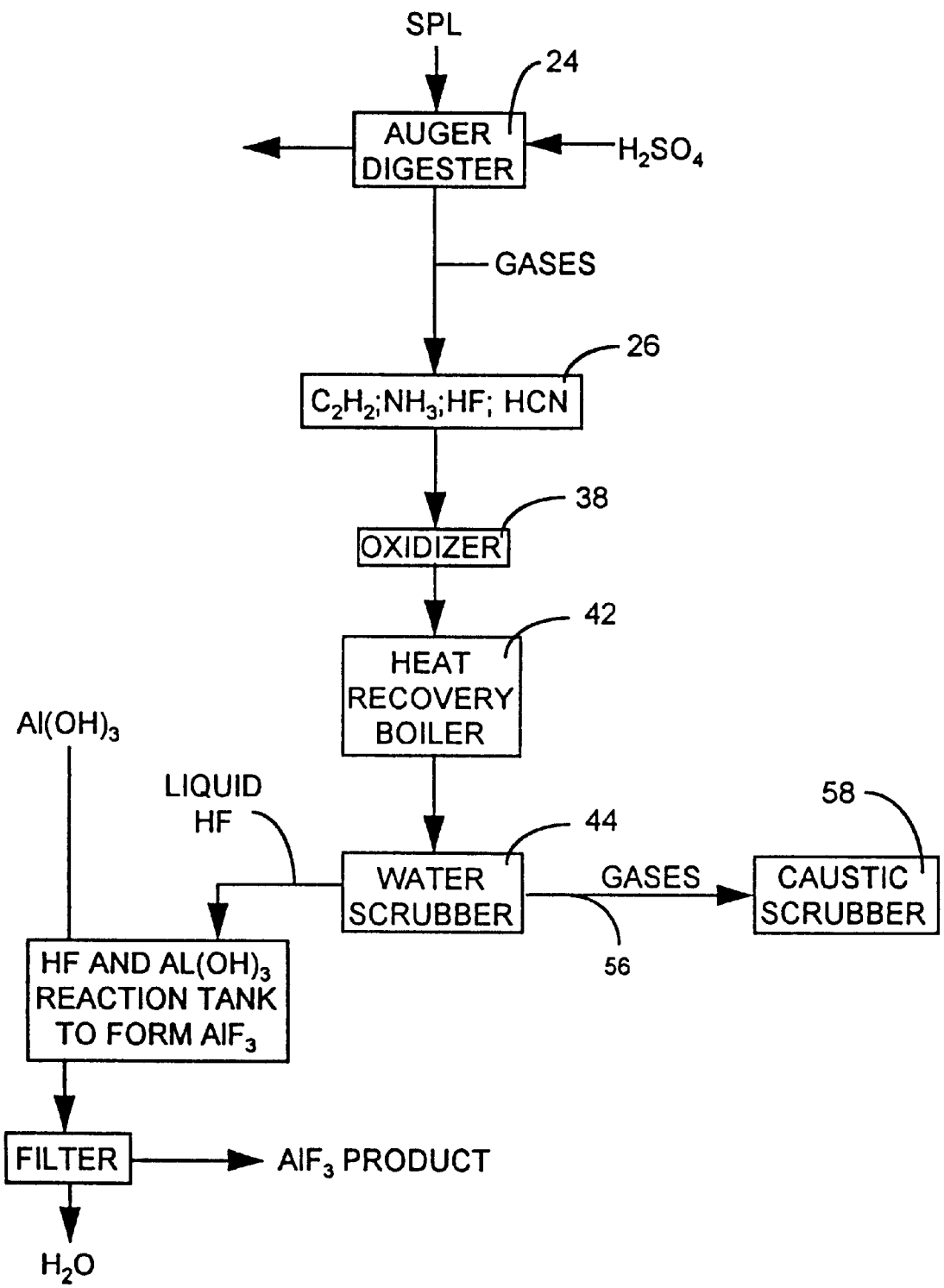
FIG. 2 is a flow diagram illustrating steps in recovering $AlF_3$ from spent potliner.
Figure 3:
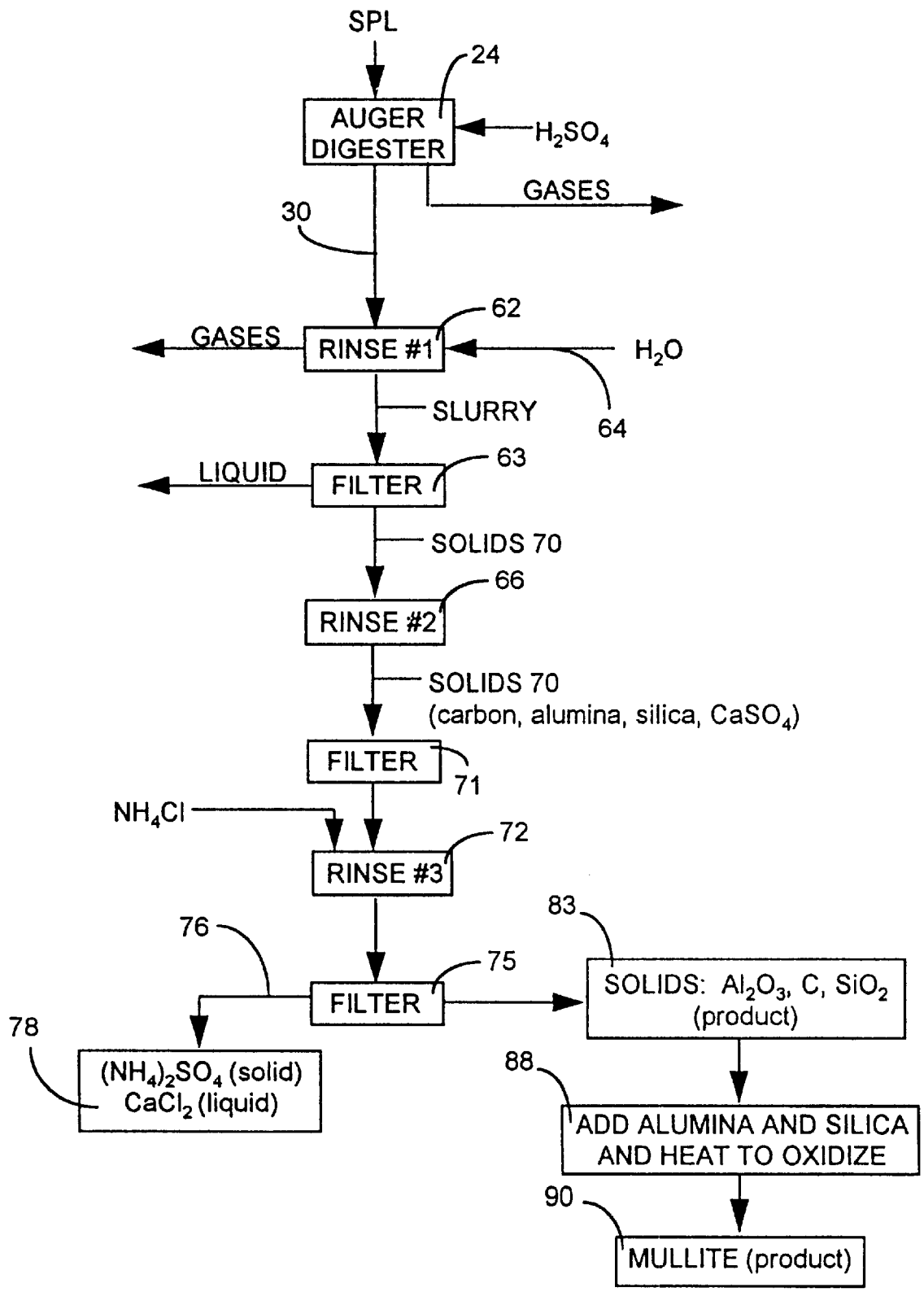
FIG. 3 is a flow diagram illustrating steps in recovering mullite, $(NH_4)_2SO_4$ and $CaCl_2$ from spent potliner.
Figure 4:
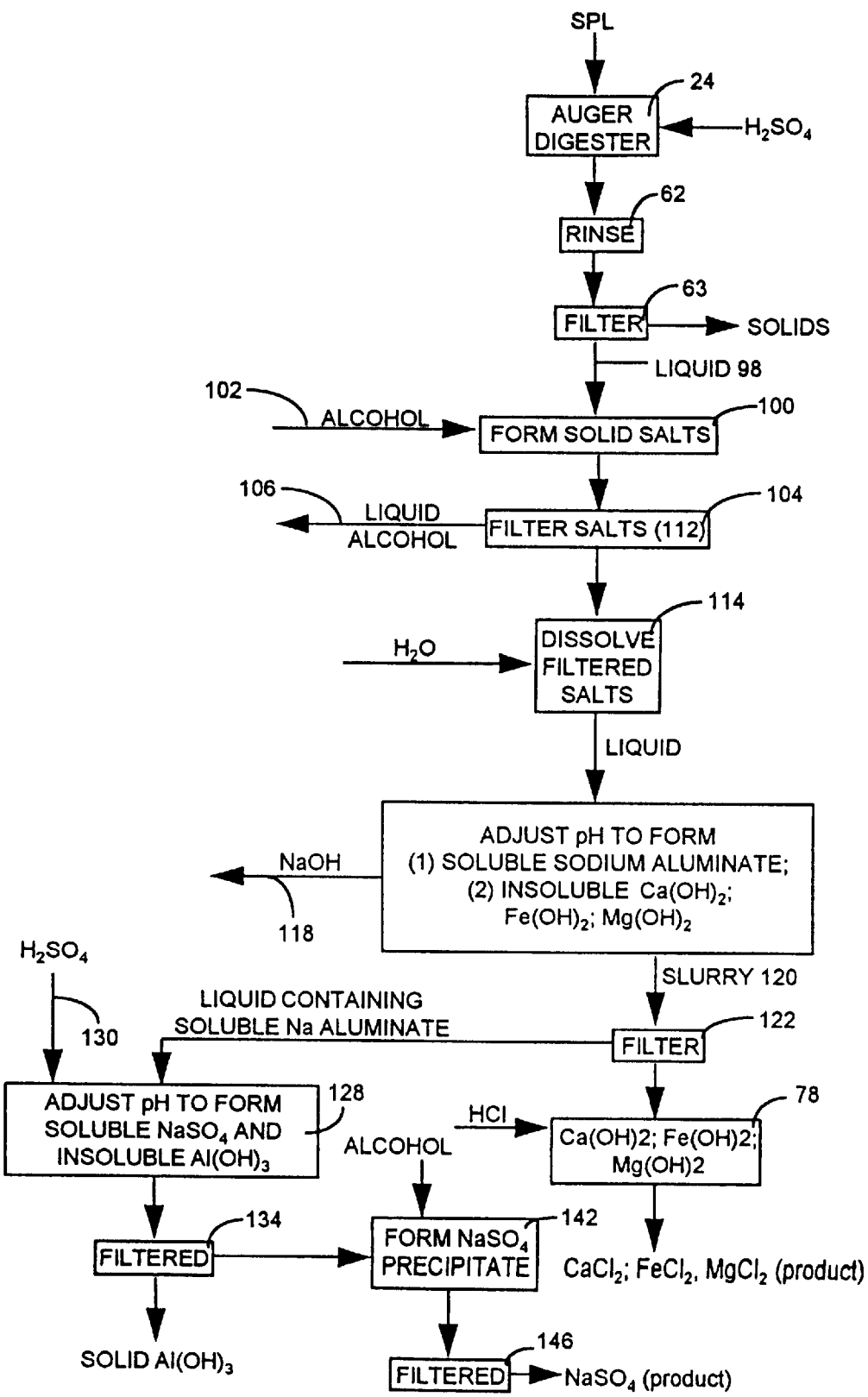
FIG. 4 is a flow diagram illustrating steps in recovering $Al(OH)_3$, $Na_2SO_4$ and metal chlorides from spent potliner.

The process of the present invention for the treatment of spent potliner (SPL) waste materials is shown diagrammatically by FIG. 1, which process is generally identified by the reference numeral 10. The input material 12 consists of SPL as its major ingredient, but may also include any other waste stream with similar chemical make-up. One preferred operation is described below, although it will be apparent to one skilled in the art that many of the steps are optional.

In preferred operations, input material 12 is pulverized by a crusher 14 to a particulate feed size of 16 mesh or less, although larger particles may be used. One preferred form of crusher operation is a two-stage process in which an initial crusher hopper 14 reduces the SPL material to approximately two-inch size pieces, with the resulting two-inch size pieces then being sent to a second crusher 15 which reduces them to about 16 mesh or less in size. The particulate material from the crushers 14 and 15 is then sent to a magnetic separator 16 which removes iron and any other ferromagnetic particulate metal 17, and in particular iron, from the particulate feed. A 16 mesh classifier 18 returns any particulate material which is greater than 16 mesh to crusher 14 through a return loop 19 in order to reduce the size of that material to 16 mesh or less, since particulate material larger than 16 mesh is not recommended or preferred.

The resulting particulate feed 20 may be directed initially into a soak tank 22 for a sufficient time, e.g., about 24 hours, and temperature to remove gases such as ammonia, acetylene and methane gases, the soak tank preferably containing neutral $H_2O$ and waste water from caustic scrubber 58 used in the polishing step. The feed 23 is then directed into an acid digester 24 containing preferably, sulfuric acid; however, other acids which liberate HF or HCN gases may be used singly or in combination with sulfuric acid. Particulate feed 23 is preferably fed into digester 24 by a sealed, variable drive, heated screw. The auger digester 24 is preferably maintained under a negative pressure in order to assist in removing gases which are generated within digester 24. In preferred operations, the digester 24 is maintained at an elevated temperature, for example, up to 300° C. and typically 100° or 135° to 250° C. The speed of the preferred input and output augers are adjusted to allow for an approximately 30–60 minute retention time of the particulate feed material 23 within the digester 24 with longer times not found to be detrimental. Shorter times can be used at higher temperatures. In the digester 24, the SPL and other materials react with the acid, e.g., sulfuric acid, causing any fluoride and cyanide material to be converted to HF and HCN gas, repectively, which is continuously removed from the digester 24 in a gas stream or gas component 28. The remaining solid material is removed from digester as a solid component 30.

In preferred operations, concentrated or strong acid 32, e.g., sulfuric (approximately 93% by weight) is added to the digester 24 at a rate of approximately 0.8 lbs $H_2SO_4$ to one pound particulate material, depending to some extent on the soluble portion of the spent potlining. The ratio of acid to particulate material by weight can range from 0.8 to 1.1 for $H_2SO_4$ acid. While, as noted, $H_2SO_4$ is the preferred acid for the digester 24, it should be understood that other acids such as $HClO_4$, $HCl$, $HNO_3$, $H_3(PO_4)$ and oleum, or combinations thereof, may also be utilized. The different acids may produce different effluent salts. However, the process can be adjusted to accommodate the different materials. Water is continuously added to the soak tank 22 at a rate to maintain the soak tank level and to maintain approximately 20% moisture content within the digester 24. The moisture or liquid content in the digester can range from 5 to 100 wt. % water to spent potliner. In preferred operations, the water added to the digester is purge water 36 from caustic scrubber 58, as described in greater detail below. By thus recycling the purge water, any fluoride salts captured from other parts of the process are recovered, and the water thus provided is at a temperature in the range of from about ambient to 120° F., thereby saving heating energy. The use of purge water also eliminates the need to dispose of the waste stream from caustic scrubber 58. Also, the recycling of the purge water provides for more favorable economics in the process.

The gas component 26 from the soak tank 22 and the gas component 28 leaving the digester 24 will normally contain hydrogen cyanide (HCN) and hydrogen fluoride (HF). The gas components 26 and 28 are then heated at heater or oxidizer 38. In preferred operations, heater or oxidizer 38 is in the form of an art known as electric converter/oxidizer which is designed to heat the gas component 28 to a temperature sufficiently high to oxidize the hydrogen cyanide, for example, to approximately 750°–850° C. in the presence of air. At this temperature, hydrogen cyanide is oxidized and converted or decomposed into a residual gas component 40 including $H_2O$, $CO_2$ and $NO_2$, $NO_x$ or $N_2$, while the HF gas remains unreacted. The residual gas component 40 is then preferably cooled in waste heat recovery boiler 42. Typically, the temperature of the gases is reduced to less than 150°–200° C. The cooled residual gas component is then directed into a water scrubber 44. The heat recovered in the boiler 42 is redirected to other stages of the process 10, as desired, to thereby save energy and enhance the efficiency of the process.

In the water scrubber 44, hydrogen fluoride in the residual gas component 40 is converted to liquid hydrofluoric acid 46 which is directed to an alumina trihydrate reaction tank 48 in which it reacts with the alumina trihydrate to form aluminum fluoride and water. Alumina trihydrate 136 is introduced into the reaction tank 48 from another portion of the process as described below. Alumina trihydrate as used herein is meant to include $Al_2O_3 \cdot 3H_2O$ or $Al(OH)_3$ and may be referred to as aluminum hydroxide, aluminum hydrate, hydrated alumina or hydrated aluminum oxide. The reaction tank 48 is heated to a temperature to effect reaction between hydrofluoric acid and the aluminum hydroxide to form aluminum fluoride. Preferably, the temperature is in the range of 135° to 250° C. with a typical temperature being about 200° F. for about three hours. The aluminum fluoride is then filtered at 49 and directed to a dryer 50 where the residual solids are heated to less than 10% moisture. These dried solids are then directed to a calciner or dryer 51 where the solids are flash heated to a temperature of about 700° C. forming aluminum fluoride 52. Water vapor 53 is redirected from the dryer 50 and reaction calciner or dryer 51 back to the water scrubber 44, thereby eliminating a waste stream at this point of the process. Gases 56 from the water scrubber 44, from which HF has been removed are then passed to a caustic scrubber 58 as a polishing step before release to the atmosphere 60. In preferred form, the caustic scrubber 58 utilizes NaOH to reach an alkaline or basic, e.g., a preferred, pH in the range of about 7.0 to 8.0. In broader aspects, it will be understood that the pH can range from 6.5 to 10. Other alkali or alkaline earth metal hydroxides may be used such as KOH and $Ca(OH)_2$, or combinations thereof. Sodium hydroxide is preferred because it causes less complications in other liquid streams of the over-all process. As described above, purge water 36 from the caustic scrubber 58 is redirected back to soak tank 22 for use therein. This eliminates another waste stream in the overall process and also recaptures any residual fluorides which were unreacted with the water scrubber 58.

The aluminum fluoride 52 which is thus produced, is the first primary solid end product of the process 10 of the present invention, and may be utilized commercially in any number of applications. For example, the aluminum fluoride 52 may be used as a bath additive for bath ratio corrections in the cell. This substantially eliminates any environmental problems caused by the fluoride materials in the SPL, and, as detailed above, provides a substantial cost benefit and savings.

Now returning to the process of the present invention at digester 24, the solid component 30 from the digester 24 is directed to a first rinse housing 62 which receives input water 64, and thence through filter 63 to a second rinse housing 66 with additional input water 65. The first rinse 62 removes water soluble salts from the input slurry 30. In the preferred process, the slurry 68 from the first rinse housing 62 passes through the filter press 63, and then the solids 69 are introduced to the second stage water rinse housing 66 for polishing. The solid stream or fraction 70 from the second water rinse 66 includes carbon and refractory materials such as alumina, silica, and, generally, a relatively high concentration of calcium sulfate salt. Due to this high concentration of calcium sulfate level, the solid stream 70 passes through a filter 71 and into a third rinse 72 which is used in the preferred processes to remove the soluble calcium sulfate salts from the solids. In preferred operations wherein mullite is a desired end product, ammonium chloride is reacted with the calcium sulfate to form ammonium sulfate and calcium chloride as indicated by the reaction formula

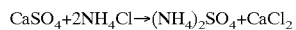

$$CaSO_4 + 2NH_4Cl \rightarrow (NH_4)_2SO_4 + CaCl_2$$

The aluminum chloride may be introduced as a solution 74 at approximately 20 wt. % and introduced with rinse 72. It will be appreciated that other concentrations may be used, e.g., from 15 to 50 wt. % $NH_4Cl$. The solution containing these two remaining salts (ammonium sulfate and calcium chloride) are filtered at 75 and carried by stream 76 to a storage unit 78 wherein they may later be recovered or reused as a calcium chloride liquid and an ammonium sulfate solid. Regardless of their later use, both of these salts are non- toxic and present no substantial environmental problem.

The solids 80 which remain after the rinses 62, 66 and 72 are filtered at 75 and are preferably directed to a mixer dryer 82 and include alumina, silica and carbon. In the alternative, the solids 80 may be directed to a storage unit 83 wherein they may be sold and readily used in cement manufacture or in the glass and ceramics industry. In another example, to the alumina 84 and silica 85 mix at mixer dryer 82, may be added alumina and/or silica to provide a ratio within mixer dryer 82 at a ratio of about 70% to 30%, by weight, alumina to silica, respectively. The alumina to silica ratio in solids 80 may be adjusted by the addition of alumina and/or silica. The alumina to silica ratio may be adjusted by adding alumina and/or silica to provide 40 to 90 wt. % alumina, the remainder silica on an alumina and silica basis. This alumina to silica mix 86 is then passed into a high temperature vessel 88 in which it is subjected to an elevated temperature to oxidize carbon in the mix. Typically, the temperature is in the range of about 1,600° to about 2,000° C. in an oxygen-rich atmosphere. This causes any carbon remaining therein to be oxidized to carbon dioxide, while simultaneously vitrifying the alumina and silica into a fused composition of alumina and silica. Typical of the fused composition is mullite 90 which can be of high purity. Mullite 90 is a second major solid end product of the process of the present invention. The mullite may be utilized to make furnace brick for use within aluminum reduction cells or for use for other commercial purposes.

In the preferred method, solids 86 are transferred to a high temperature vessel 88 and subjected to an elevated temperature in the presence of an oxygen-rich atmosphere. This causes remaining carbon to oxidize to carbon dioxide thereby providing 8000 to 9000 BTU/lb energy and a usable refractory material 90, e.g., mullite.

In preferred processes, the oxygen-rich atmosphere within the vessel 88 is maintained by introducing oxygen, preferably in the form of air 92, to the vessel 88. Carbon dioxide and heat as well as small amounts of gases, HF and particulates, are removed from the vessel 88 in the form of a heated gas stream 93 and are then directed through a heat recovery boiler 94 to a bag house 95. In the bag house 95, the particulates are removed and redirected as bag house catch 96 to the soak tank 22, while the gases 97 are directed to the caustic scrubber 58 and then back to the soak tank 22. Thus, the carbon in the SPL is used for useful purposes within the process 10 of the present invention as a fuel source to lower energy costs of the system, rather than remaining as a useless landfill material typical of prior SPL treatment processes or systems.

The liquid fraction 98 form the first and second rinse housings 62 and 66, respectively, having been filtered at 63 is then directed to an alcohol separator 100. In the separator 100, alcohol, for example methanol or ethanol 102, is admixed with the liquid 98 in a volume ratio of approximately 4:1 alcohol to liquid fraction, for example. The ratio of alcohol to liquid fraction can range from 10:1 to 1:5, for example, depending on the liquid fraction. This step is capable of separating about 97% or more of the salts in the liquid fraction 98 which are filtered out of slurry stream 103 at filter 104. The liquid stream 106 from the filter 104 includes the alcohol and excess acid from the digester 24 and is directed through a recovery evaporation still 108 wherein alcohol is separated and returned to the alcohol storage source 102. The remaining sulfuric acid is stored at 110 and eventually returned along line 22 a to soak tank 22 (FIG. 1) for reuse in the digester 24. In this manner, the use of sulfuric acid and sodium hydroxide in the process 10 can be reduced, while alcohol is recovered and reused, thus enhancing the economics of the process 10 as compared to prior art systems.

The salts 112 from the filter 104 are redissolved in a water bath 114 and then pH adjusted in tank 116 to a basic pH, for example, preferably using sodium hydroxide 118 to a pH of about 12.0 to 12.5. It will be appreciated that any basic pH can be used that is effective in forming a soluble aluminate, e.g., sodium aluminate and insoluble impurities such as metal hydroxides. For example, the pH can range from 11.8 to 13. A pH of 12 to 12.5 is an example of a pH which is effective. Also, sodium hydroxide is an example of a metal hydroxide which can be used. However, any alkali or alkaline earth metal hydroxide may be used and is effective in forming a soluble aluminate and insoluble metal hydroxides. For example, KOH and $Ca(OH)_2$ may be used. Thus, this step forms a slurry 120 containing soluble sodium aluminate and insoluble impurities including calcium, iron and magnesium compounds such as calcium hydroxide, iron hydroxide and magnesium hydroxide. The insoluble impurities are filtered at 122 and directed via solids stream 124 to the storage tank 78.

HCl 125 can be introduced to the tank 78 to react with the metal hydroxides and produce metal chlorides, for example, to produce a mixture 127 of calcium chloride, iron chloride and magnesium chloride, which mixture 127 is a useful product for use in industrial water treatment.

The liquid fraction 126 from the filter 122 is directed to a second pH correction tank 128 wherein an acid 130, such as sulfuric acid, is added to lower the pH, for example, to about 7.0 to 8.0 to precipitate alumina trihydrate. This step forms a slurry 132 containing soluble sodium sulfate and alumina trihydrate precipitate. It will be understood that other acids may be used to lower the pH. Further, the pH used is a pH which enables separation of the sulfate from the hydroxide.

The alumina trihydrate may be removed from the solution in another way. That is, alumina trihydrate may be precipitated between the range of 11.8 to 125 by slowly adjusting the pH of the solution with acid such as sulfuric acid down to pH 11.8 and thereafter allowing the pH to adjust upwardly. This procedure is repeated until the pH will not rise above the pH of 11.8. This precipitates the crystal form of alumina trihydrate instead of the gel form. This is the preferred method for recovering alumina trihydrate.

The slurry 132 is then filtered and rinsed at 134, and the alumina trihydrate solids 136 are polished at 138 and then redirected as the alumina trihydrate stream 54 to the reaction tank 48 to form aluminum fluoride as previously discussed. The sodium sulfate containing liquid stream 140 from the filter 134 is directed to a second alcohol separation tank 142 wherein alcohol 144, as noted earlier, either methanol or ethanol, is mixed with the liquid stream in a volume ratio of approximately 4:1 alcohol:liquid stream to precipitate sodium sulfate. The ratio of alcohol to liquid stream can range from 10:1 to 1:5, for example. The precipitated sodium sulfate is filtered at 146 and is then directed to a dryer 148 and then storage 150, wherein the resultant sodium sulfate is approximately 99.0% pure. The liquid portion 152 is directed from the filter 146 to an alcohol recovery still 154 wherein alcohol is separated and directed via stream 156 back to storage unit 144 for reuse in the process, while the water stream 158 is directed to water recycle storage unit 160 for reuse within the process 10, such as at 114.

Figure 5:
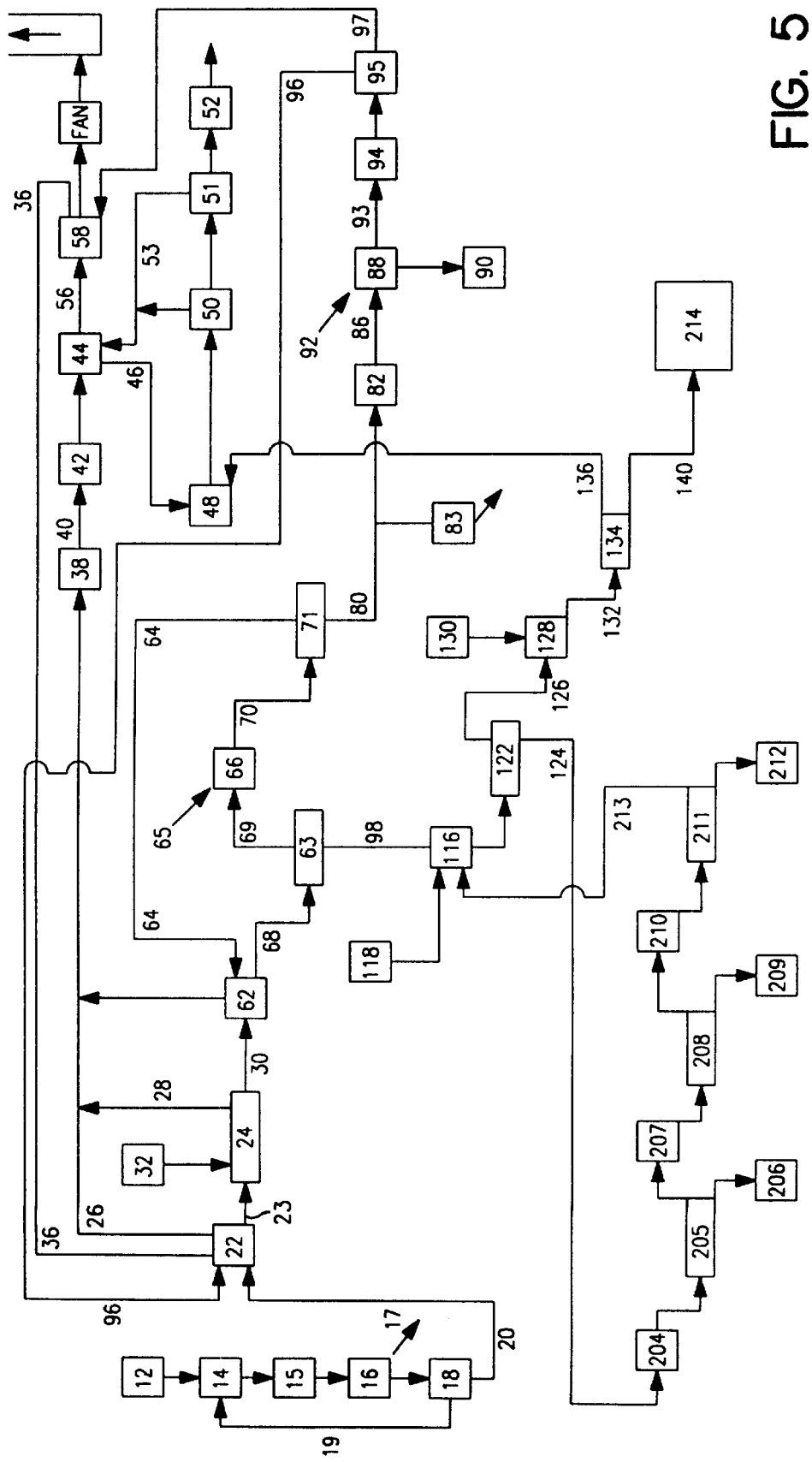
FIG. 5 is a flow diagram showing an alternate method of treating calcium, iron and magnesium compounds in spent potliner.

Alternatively, as shown in FIG. 5, liquid fraction 98 resulting from the first and second rinse housings 62 and 66, respectively, having been filtered at 63 is directed to tank 116 where the pH is adjusted. As noted, the pH is adjusted to form soluble sodium aluminate and insoluble impurities, e.g., calcium hydroxide, iron hydroxide and magnesium hydroxide. The insoluble impurities are filtered and directed to tank 204 where the pH of the liquid in tank 204 is adjusted. In tank 204, the pH is lowered and the tank heated to precipitate calcium compounds, e.g., calcium sulfate. Typically, the pH is adjusted to a pH less than 1 by the addition of an acid such as $H_2SO_4$. Also, typically the tank is heated to a temperature in the range of 80° to 110° C. The calcium compounds, e.g., calcium sulfate, are filtered at 205 and then stored in storage tank 206.

Liquid from filter 205 is directed to tank 207 where the pH is adjusted to precipitate iron compounds such as iron hydroxide. Typically, the pH is adjusted upwardly to a pH in the range of 4.5 to 5.5. The precipitate is filtered at 208 and stored in storage tank 209.

Liquid from filter 208 is directed to tank 210 where the pH is again adjusted to precipitate magnesium compounds such as magnesium hydroxide. The magnesium compounds are precipitated by adjusting the pH to a pH in the range of 10.5 to 12. Thereafter, the magnesium precipitate is removed at filter 211 and stored in tank 212. Then, liquid stream 213 from filter 211 is directed to tank 116 to enhance aluminum recovery. The three compounds recovered, e.g., calcium sulfate, iron hydroxide and magnesium hydroxide, are relatively pure and thus have good commercial value.

As the result of the above process 10, spent potliner material is reduced and recycled into commercially useful ingredients, that is, aluminum fluoride; mullite raw brick material; Abrick material $Al_2O_3$, C and $SiO_2$ useful in cement or glass manufacture. Sodium sulfate, calcium sulfate, magnesium hydroxide and iron hydroxide are also recovered.

EXAMPLE

Sixty tons per day of SPL feed, including caked materials and sweepings, is continuously introduced to the crusher 14 and is processed through the steps of the process 10 as described above. Utilizing this process, the 60 tons/day SPL input 12 yields approximately 13 tons/day aluminum fluoride end product, approximately 10 tons/day of a refractory material, and approximately 50 tons/day of reusable salts, e.g., sodium sulfate, for a total of about 73 tons of recycled solid materials, with the balance of the starting materials being converted to harmless gases and salts. In processing this 60 tons/day of SPL input 12, substantially all of the cyanides contained therein are destroyed, and substantially all of the fluorides are converted to aluminum fluoride as a useful end product. Thus, these highly environmentally damaging materials are either eliminated or converted to useful products.

As can be seen from the above, the present invention provides a highly efficient process for not only treating the significantly hazardous spent potliner material from aluminum reduction cells, but also serves to convert the components of the SPL to useful end products. Moreover, there are no significant amounts of solid waste material from the process of the present invention which must be subsequently disposed of in landfills or stored, as previously required in other processes and practices for treating spent potliner material. In addition, the process of the present invention efficiently recycles water and heat and produces refractory material which can be used in the fabrication of new aluminum reduction cells, thereby providing a highly efficient and economic process without a liquid or noxious gas waste stream. The primary end products of aluminum fluoride, refractory material and sodium sulfate are all usable, either in the actual manufacture of aluminum reduction cells or in other commercial endeavors. The stored impurities of calcium sulfate, iron hydroxide, magnesium hydroxide, ammonium sulfate and calcium chloride are all benign, and are all treatable in accordance with conventional processes and may be reclaimed for a wide variety of commercial uses since they include no environmentally hazardous materials, such as for water treatment to recover fluoride and solids. As a result, it is seen that the present invention is a highly efficient process and very economical in both its operation as well as its yield, and that it avoids having to deposit fused solid material containing environmentally hazardous component into landfills or storage.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention. It should be further understood that the scope of the present invention is to be limited only to the claims except as precluded by the prior art. Moreover, the invention as disclosed herein may be suitably practice in the absence of the specific elements or steps which are disclosed herein.

What is claimed is:

1. A method of recovering $AlF_3$ from spent potliner material from aluminum reduction cells, which spent potliner material includes at least one material selected from the group consisting of fluoride compositions, cyanide compositions, iron compositions, calcium compositions, magnesium compositions, alumina, carbon, silica and sodium sulfate, comprising the steps of:

(a) contacting the spent potliner with an acid in an acid digester to produce a gas component containing HF gas and HCN gas and a slurry component containing at least one component selected from the group consisting of carbon, silica, alumina, sodium sulfate, iron sulfate, calcium sulfate and magnesium sulfate;

(b) separating said gas component from said slurry component;

(c) after separating, heating said gas component to a temperature in the range of 750° to 850° C. in an oxidizing atmosphere to convert said HCN to $CO_2$, $H_2O$ and oxides of nitrogen to provide a gaseous mixture containing unreacted HF gas;

(d) treating said gaseous mixture with water to form hydrofluoric acid;

(e) reacting said hydrofluoric acid with alumina trihydrate to form $AlF_3$ in an aqueous solution; and (f) recovering said $AlF_3$ from said aqueous solution.

2. The method in accordance with claim 1 wherein said acid is selected from the group consisting of $H_2SO_4$, $HNO_3$, $HClO_4$, HCl and $H_3(PO_4)$.

3. The method in accordance with claim 1 wherein said acid is $H_2SO_4$.

4. The method in accordance with claim 1 including maintaining said digester at less than atmospheric pressure to facilitate removing said gas component therefrom.

5. The method in accordance with claim 1 including maintaining said slurry in said digester at a temperature in the range of 135° to 300° C.

6. The method in accordance with claim 1 including maintaining said slurry in said digester at a temperature in the range of 135° to 160° C.

7. The method in accordance with claim 3 including maintaining said sulfuric acid in said digester in a ratio of 0.8 to 1.1 acid to spent potliner on a weight basis.

8. The method in accordance with claim 1 including reacting said hydrofluoric acid with alumina trihydrate to form said $AlF_3$ at a temperature range of 100° to 300°.

9. The method in accordance with claim 1 including drying said $AlF_3$ to less than 10 wt. % moisture.

10. The method in accordance with claim 1 including flash heating said $AlF_3$ to remove water therefrom.

11. A method of recovering $AlF_3$ from spent potliner material from aluminum reduction cells, which spent potliner material includes at least one material selected from the group consisting of fluoride compositions, cyanide compositions, iron compositions, calcium compositions, magnesium compositions, alumina, carbon, silica and sodium sulfate, comprising the steps of:

(a) contacting the spent potliner with sulfuric acid in an acid digester to produce a gas component containing HF gas and HCN gas and a slurry component containing at least one component selected from the group consisting of carbon, silica, alumina, sodium sulfate, iron sulfate, calcium sulfate and magnesium sulfate;

(b) maintaining said slurry component at a temperature range of 135° to 300° C. in said digester;

(c) maintaining said digester at less than atmospheric pressure and separating said gas component from said slurry component;

(d) heating said gas component to a temperature in the range of 750° to 850° C. in an oxidizing atmosphere to convert said HCN to $CO_2$, $H_2O$ and oxides of nitrogen to provide a gaseous mixture containing unreacted HF gas;

(e) treating said gaseous mixture with water to form hydrofluoric acid;

(f) reacting said hydrofluoric acid with aluminum hydroxide to form $AlF_3$ in an aqueous solution; and (g) recovering said $AlF_3$ from said aqueous solution.

* * * * *